D. DANN.
INDICATOR FOR AUTOMOBILES.
APPLICATION FILED APR. 27, 1912.
1,050,812.
Patented Jan. 21, 1913.
2 SHEETS—SHEET 1.
Fig. 1.
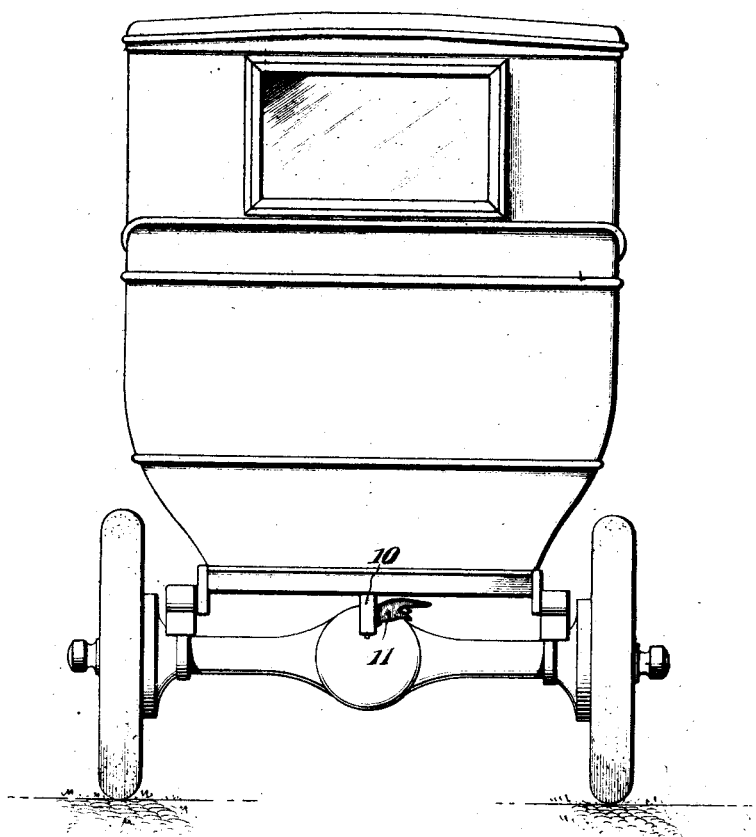
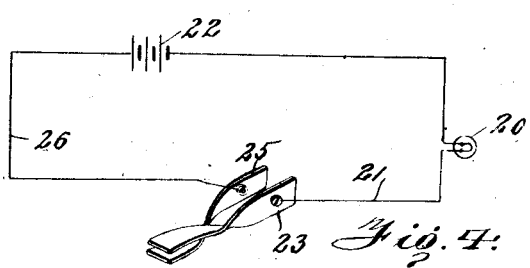
Fig. 4.
Witnesses
Inventor
Duane Dann
By
Attorney

D. DANN.
INDICATOR FOR AUTOMOBILES.
APPLICATION FILED APR. 27, 1912.

1,050,812.

Patented Jan. 21, 1913.

2 SHEETS—SHEET 2.

Witnesses

Inventor
Duane Dann
By
Attorney

UNITED STATES PATENT OFFICE.

DUANE DANN, OF CHICAGO, ILLINOIS.

INDICATOR FOR AUTOMOBILES.

1,050,812.  Specification of Letters Patent.  Patented Jan. 21, 1913.

Application filed April 27, 1912. Serial No. 693,578.

*To all whom it may concern:*

Be it known that I, DUANE DANN, a citizen of the United States, residing at Chicago, in the county of Cook and State of Illinois, have invented certain new and useful Improvements in Indicators for Automobiles, of which the following is a specification.

This invention relates to indicators for automobiles and other vehicles to indicate the direction the driver is going to turn, and its object is to provide a device of this kind which is simple in construction, reliable in operation, and easily actuated.

The invention also has for its object to provide, in connection with the indicator, an electric lamp, the circuit of which is controlled by the movement of the indicator.

Other objects and advantages of the invention will be pointed out in the detailed description appearing hereinafter.

In order that the invention may be better understood, reference is had to the accompanying drawing, in which—

Figure 2:
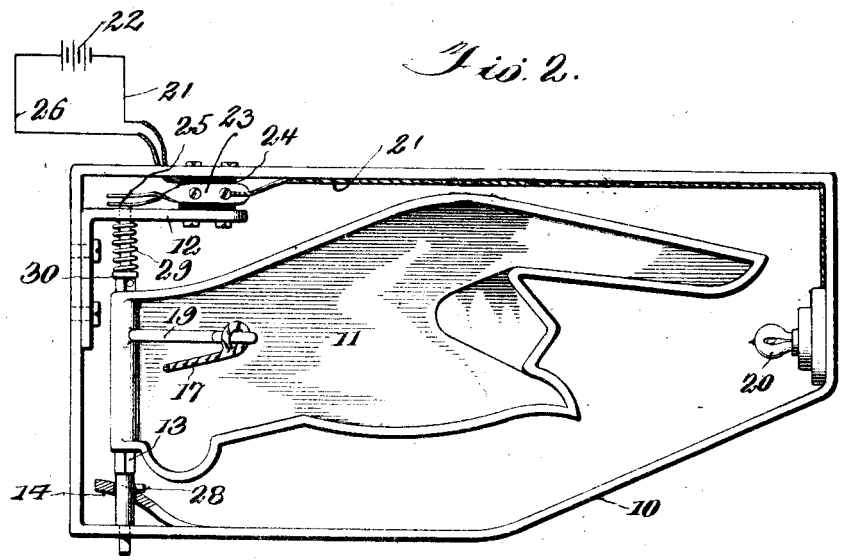
Figure 3:
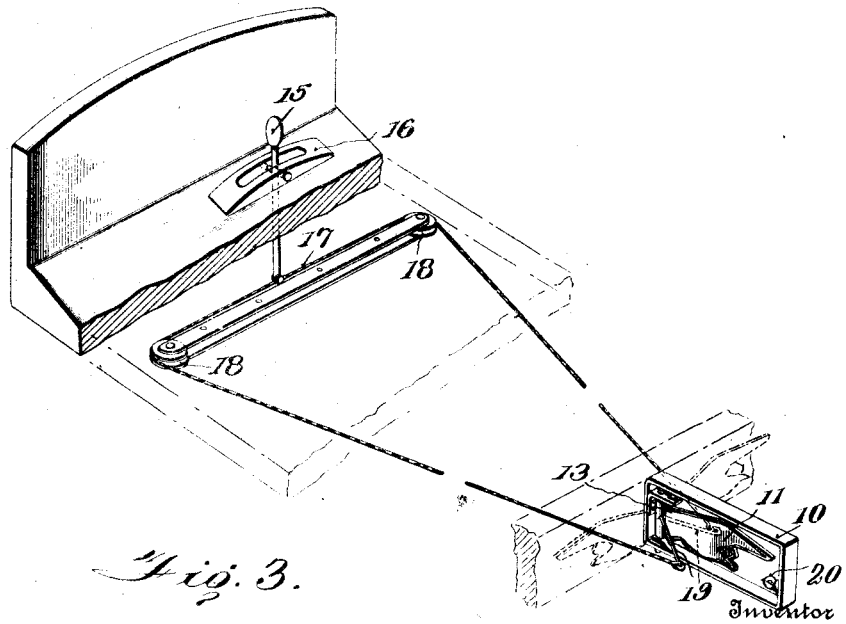

Figure 1 is a rear end view of an automobile equipped with the indicator. Fig. 2 is an elevation of the indicator. Fig. 3 is a perspective view illustrating the means for operating the indicator. Fig. 4 is a diagrammatic view of the electric circuit.

Referring specifically to the drawing, 10 denotes an open supporting frame within which is pivotally mounted an indicator 11, which, in the present instance has the outline of a hand. This frame is mounted in any suitable manner on the rear sill of the car so that the indicator when swung into indicating position may be visible to the driver of a car following behind. To one of the side bars of the frame, on the inside thereof, is secured a horizontally extending bracket arm 12 having a pivot opening to receive the upper end of a vertical spindle 13 to which the indicator is made fast. An arm 14 extends obliquely upward from the bottom bar of the frame on the inside thereof, and has a pivot opening to receive the lower end of the spindle. This arm may be formed integral with the bottom bar. The spindle is free to rotate in the aforesaid pivot openings, and as the indicator 11 is made fast to the spindle, it will be seen that it can be swung out of the frame in either direction to point to the right or to the left upon rotating the spindle. For actuating the spindle 13, there is provided a foot-lever 15 which is set in a block 16 mounted on the front floor of the car, said lever being pivoted in a slot in the block so as to swing transversely of the car. The lever extends beneath the floor and to its lower end are connected cords 17 which extend in opposite directions to guide pulleys 18, over which latter they pass and thence extend rearward and are connected to arms 19 carried by and extending in opposite directions from the spindle. The indicator 11 is normally positioned within the frame, and by operating the lever 15, it is swung out of the frame to point to the right or left as desired. The frame 10 also carries a light, which is an ordinary incandescent electric lamp 20. One of the circuit wires 21 of the lamp, leading from one side of a suitable current source 22 on the car, is connected to a tongue 23 fastened to one side of a block 24 of insulating material which is mounted on the bracket arm 12. To the other side of the block 24 is secured a tongue 25 which is connected by a conductor 26 to the other side of the current source 22. The two tongues 23 and 25 extend from one end of the block and their projecting ends are twisted so as to present two vertically spaced switch-tongues. The switch-tongues are normally out of contact, so that the lamp circuit is broken, said circuit being closed by bringing the switch-tongues together.

The switch-tongues are operated by the following devices: The spindle 13 is movable in the direction of its length and the switch-tongue 25 is in the path of its upper end. The arm 14 is inclined, and the spindle carries a projecting pin 28 which engages the incline. It will therefore be evident that the spindle is moved upward when it is rotated in either direction to project the indicator 11 from the frame 10, thus closing the lamp circuit by bringing the tongue 25 in contact with the tongue 23. When the indicator is swung back into the frame, the pin 28 slips down the incline, thereby allowing the spindle drop and the switch tongues to separate to break the lamp circuit. The downward movement of the spindle is assured by a spring 29 coiled around its upper end, between the bracket-arm 12 and an abutment 30 on the spindle.

The preferred embodiment of the invention has been shown, but it will be understood that various changes in the structural details may be made without a departure from the spirit and scope of the invention.

I claim:

1. The combination with a vehicle of a support mounted thereon, bearings carried by the support, one of said bearings having an incline, a rotatable spindle journaled in the bearings and free to move in the direction of its length, a pin carried by the spindle and engageable with the incline, an indicator carried by the spindle, an electric lamp, a switch controlling the lamp circuit, said switch being controlled by the longitudinal movement of the spindle, and means for rotating the spindle.

2. The combination with a vehicle of a support mounted thereon, bearings carried by the support, one of said bearings having an incline, a rotatable spindle journaled in the bearings and free to move in the direction of its length, a pin carried by the spindle and engageable with the incline, an indicator carried by the spindle, an electric lamp, a switch controlling the lamp circuit, said switch comprising spaced tongues, one of which tongues is in the path of one end of the spindle, and means for rotating the spindle.

3. The combination with a vehicle, of an open frame mounted thereon, bearings carried by the frame, one of said bearings having an incline, a rotatable spindle journaled in the bearings and free to move in the direction of its length, a pin carried by the spindle and engageable with the incline, an indicator carried by the spindle and swinging out of the frame when the spindle is rotated, an electric lamp carried by the frame, a switch controlling the lamp circuit, said switch being controlled by the longitudinal movement of the spindle, and means for rotating the spindle.

4. The combination with a vehicle, of a support mounted thereon, bearings carried by the support, a rotatable spindle journaled in the bearings and free to move in the direction of its length, an indicator carried by the spindle, an electric lamp, a switch controlling the lamp circuit, said switch being controlled by the longitudinal movement of the spindle, means for rotating the spindle, and means for moving the spindle in the direction of its length.

In testimony whereof I affix my signature in presence of two witnesses.

DUANE DANN.

Witnesses:
S. J. LEHRER,
H. G. BATCHELOR.